United States Patent [19]
Stauderer et al.

[11] Patent Number: 5,916,645
[45] Date of Patent: Jun. 29, 1999

[54] PROCESS FOR THE MANUFACTURE OF A PRODUCT CONTAINING POLYSACCHARIDE, AND POLYSACCHARIDE COMPOSITIONS

[75] Inventors: Markus Stauderer, Trostberg; Ludwig Kaltenhauser, Tittmoning, both of Germany

[73] Assignee: K & S Bio-Pack-Entwicklungsgesellschaft fur Verpackungen mbH, Germany

[21] Appl. No.: 08/492,018

[22] PCT Filed: Jan. 14, 1994

[86] PCT No.: PCT/DE94/00029

§ 371 Date: Sep. 5, 1995

§ 102(e) Date: Sep. 5, 1995

[87] PCT Pub. No.: WO94/17107

PCT Pub. Date: Aug. 4, 1994

[30] Foreign Application Priority Data

Jan. 21, 1993 [DE] Germany .............................. 43 01 587

[51] Int. Cl.$^6$ ....................................................... C08L 3/06
[52] U.S. Cl. .................. 428/35.7; 426/573; 426/549; 426/615; 426/629; 426/634; 426/442; 426/478; 426/518; 106/206.1; 241/24.1
[58] Field of Search ............................ 428/35.7; 127/65, 127/66, 67; 241/7, 8; 106/206.1; 426/573, 549, 615, 629, 634, 442, 478, 518

[56] References Cited

U.S. PATENT DOCUMENTS 4,689,409   8/1987   Reeve et al. ............................ 536/102

FOREIGN PATENT DOCUMENTS 0 201 226 B1   3/1993   European Pat. Off. ........ C08B 30/04

OTHER PUBLICATIONS

Aufsatz von N.U. Haase, "Amylosereiche Erbsenstarke—Eigenschaften und Anwendung" 1989, pp. 112–115.

Gunther Teege, "Starke und Starkederivate", 1984, pp. 79–85.

E. Gabriel–Blanke, et al., "Gewinnung von Erbsenstarke im Technikumsmasstab", 1990, pp. 239–247.

*Primary Examiner*—Charles Nold
*Attorney, Agent, or Firm*—Pendorf & Cutliff

[57] ABSTRACT

The present invention provides a process for the manufacture of a product essentially containing amylose from vegetable materials, in particular from peas. To this end, the flour is mixed with an alkaline decomposing agent, and then a separation into a liquid protein phase and a solid phase containing polysaccharide is performed. The solid phase is then re-suspended and subjected to several sifting steps, followed by at least one washing step and subsequently a drying step. From such polysaccharide material, in particular from amylose, any kind of moisture-resistant, flexible, and in particular biodegradable articles can be produced by means of conventional plastics technologies, in particular the injection molding technique. A particular advantage of the present invention resides in the fact that the thermoplastic polysaccharide material, which is produced from renewable raw materials, can also be processed into sheets which in turn can then be worked with conventional plastics techniques.

30 Claims, No Drawings

PROCESS FOR THE MANUFACTURE OF A PRODUCT CONTAINING POLYSACCHARIDE, AND POLYSACCHARIDE COMPOSITIONS

BACKGROUND OF THE INVENTION

1. Field of the Invention

The present invention concerns a process for the manufacture of a product essentially containing polysaccharide, a polysaccharide product, a polysaccharide composition and an article.

2. Description of the Related Art

It is known to isolate the amylose from amylose-containing plants or plan parts, such as from potatoes.

However, amyloses of that kind are not suitable to serve as a substitute for plastics in the plastics processing industry.

In this content, particularly the aspect of renewable raw materials and their full biodegradability are of interest.

A major problem in industrial exploitation of renewable raw materials resided in the fact that the biopolymers contained in thee vegetable raw materials were present in too low a content on the one hand, and that they just could not be processed like the chemical polymers used in the plastics processing industry on the other hand.

Another problem resides in the fact that hitherto known biopolymers, such as proteins or polypeptides, polynucleotides and polysaccharides, which are present in a variety of plant and animal raw materials, have only an extremely low resistance against moisture.

SUMMARY OF THE INVENTION

Therefore it is the object of the present invention to provide a process for producing a biopolymer, the process product of which may be processed into articles of practical use.

By the process of the invention, it is for the first time made possible to produce a polysaccharide product largely free of protein from a vegetable material.

DETAILED DESCRIPTION OF THE INVENTION

A specific polysaccharide product, namely an amylose, is obtained when pea seeds are used as the vegetable material.

A specific polysaccharide product is also obtained when e.g. dent maize is used, with essentially corn starch, in particular Hyline7, being the resulting polysaccharide product.

The polysaccharide product obtained from the process of the invention generally is obtained in the form of a powder which may, however, be processed into a granulate by conventional measures, e.g. by extrusion.

The polysaccharide product obtained by means of the process of the invention furthermore has thermoplastic properties. This applies in particular to an amylose obtained from pea varieties which are relatively rich in amylose.

Typically, so-called wrinkled peas are used herefor which have a particularly high amylose content, however advantageous polysaccharide products are equally obtained when e.g. dent maize is used.

Amylose-polysaccharide products obtained from such pea varieties have the advantage of having thermoplastic properties and may thus be further processed with the processes common in plastics processing technology. There is consequently no necessity whatsoever for costly supplementary modifications of the previously existing industrial plastics processing facilities, so that from an economic point of view such products can be manufactured at low costs.

A particular advantage of such amylose-polysaccharide products moreover resides in the fact that the price per kilogram lies about in the range for conventional thermoplastics. At the same time, there is no dependency on the raw material "mineral oil", but on the contrary, the increasing demand can be met by renewable raw materials, thereby providing farmers with far-reaching new tasks especially within the framework of the EC. Thus, for example, the harvest of peas cultivated on approximately 400 hectares may yield a total amount of approximately 1.2 metric tons of amylose.

The price can, however, moreover be reduced drastically by using a polysaccharide composition, wherein an amylose-polysaccharide product figures merely as a main constituent and at least one more material of vegetable origin is contained in the composition.

A wide variety of vegetable materials is available, whereby the properties of the polysaccharide composition or of a product manufactured therefrom may also be controlled specifically.

By means of such a polysaccharide composition the cost may, on the one hand, be further reduced, and on the other hand no or at least only little expense in terms of machinery is required so that such a polysaccharide composition may be processed by the processes common in plastics technology, in particular injection molding.

A preferred polysaccharide composition which was already tested under practical conditions and which is inexpensive. This polysaccharide composition, too, has thermoplastic properties so that it may be further processed into articles.

In this context, it is of extraordinary economic importance that the articles of the present invention entirely consist of natural products and thus are essentially entirely biodegradable, so that in contrast with typical plastics parts, no waste disposal problems will arise.

On the contrary, the articles of the present invention, in particular those of amylose-polysaccharide product, can not only be disposed of biologically by composting, feeding to livestock, burying in the soil, but furthermore provide a useful effect in the manner of a fertiliser or feedstuff, inasmuch as bacteria, fungi and other organisms ubiquitous in nature use the polysaccharide for nourishment and thus reconvert it into mineral substances useful for plants, whereas animals possess the enzymatic apparatus to obtain energy from polysaccharide products.

As the polysaccharide products according to the invention chemically speaking are polyoses, from a toxicological viewpoint there are also no reservations regarding their use in the area of foodstuffs and/or waste disposal.

The articles have the advantage that sheets for the plastics processing industries may be used e.g. for deep-drawing, embossing or the like, without problems of their disposal occcurring, either, whereas all the known advantages of plastics technology are also available with the sheets of the present invention.

Moreover, the present invention plays an outstanding role in the field of biodegradable packaging materials of any kinds which may be manufactured from the polysaccharide products of the present invention.

The outstanding importance of the present invention particularly evident in disposable articles such as e.g. drinking vessels of any kind, since in practical use of the articles according to the invention, thousands of tons of non-biodegradable plastics can be saved.

The articles produced thereby represent advantageous further developments of the present invention.

A particular advantage can be found in a transparent article, as it might become possible, due to transparent production possibilities, to practically replace currently available transparent packaging materials altogether.

Further advantages and features of the present invention ensue from the following description of exemplary embodiments.

EXAMPLE 1

In the present example, the production of a product essentially containing polysaccharide—in an exemplary case amylose—from wrinkled peas is described. In comparison with round peas, wrinkled peas have a number of drawbacks concerning the raw material which make it in a considerable degree difficult to isolate amylose therefrom. These drawbacks are in particular founded in a problematic amylose-protein complex.

Because of a considerable crude fiber content, obtention of a polysaccharide product is also rendered difficult inasmuch as the strongly swelled fibers bind quite a considerable portion of amylose during the separation of amylose and crude fiber. Although not reducing the quality of the amylose, this does, however, bring about considerable losses of yield. The amylose losses may distinctly be reduced by repeatedly re-washing the fiber fractions. This, however, considerably increases the demand for fresh water. Fiber separation even prior to starting the actual wet processing is more efficient. After dry grinding of the wrinkled peas on the roller mill, the crude fiber content may be reduced by approximately 75% by sifting.

In this manner, approximately 12% of the dry substance are obtained as a bran fraction (grist bran or farina bran) together with approximately 88% of wrinkled-pea flour. Because the crude fiber content of the bran fraction amounts to approximately 52%, the crude fiber content of the wrinkled peas is reduced from 8.0% to 2.0% in the wrinkled-pea flour. The amylose losses of 1.8% in the bran fraction are negligible.

Another drawback of the wrinkled peas is the wrinkly shape of their seeds. In comparison to than round peas, they can thus not be peeled prior to dry grinding, which would result in a further reduction of the crude fiber content in the wrinkled-pea flour. Due to the high proportion of fine grain in the wrinkled-pea amylose, the amylose-protein separation is rendered considerably more difficult since for complete sedimentation of the amylose grains in the gravity field of a separator, in particular a decanter, a relatively long sojourn time is required. Hereby the operational capacity is reduced on the one hand, and sedimentation of larger protein particles is favored. Owing to this fact the amylose, which is present in the underflow of the decanter, is contaminated with protein in a higher degree than in the case of amylose-protein separation of round peas.

The high fine-grain proportion does, however, facilitate crude fiber separation by means of a sieve bend or stream elution apparatus, since use can be made of relatively fine-meshed sieves. After extensive preliminary tests a mesh aperture of approximately 75 μm for the sieve basket of the stream elution apparatus may be termed favorable. At this mesh aperture, the amylose losses in the fiber fraction are still relatively small although a good fiber separation is already achieved.

A particular problem of wrinkled peas is their amylose-protein complex. This strong bond of protein particles to amylose grains can only be neutralised by drastic measures. Steeping in diluted caustic soda solution at room temperature or application of physical disintegrating techniques such as e.g. high-pressure homogenisation may be taken into consideration.

As the dispersing medium for the wrinkled-pea flour, diluted caustic soda solution (0.03 n) and tap water were used. Although solubility of the protein may be increased by means of diluted caustic soda solution, it will in the process be partly denatured depending on the chosen work conditions, which does, however, not constitute a disadvantage if further use of the protein is not intended.

Solubility of the protein increases with increasing pH values so that at pH=9.0, 75–90% of the protein can be extracted depending on the kind of the leguminous plant. Solubility or dispersibility of the protein may also be essentially increased by addition of basic salts such as e.g. sodium carbonate, sodium hydrogen phosphate or sodium citrate. The influence of the ionic strength (salt concentration) of the aqueous solvent, which is relatively high below pH =7.0, becomes clearly less at higher pH values. By means of neutral salts such as sodium sulfate, calcium-chloride or magnesium chloride, solubility of protein is initially reduced at low salt concentrations to then rise to about the value of pure water at higher concentrations.

According to the method of the invention, 10 kg of wrinkled-pea flour are broken up in 50 kg of 0.03-n caustic soda solution for 1 h under intense stirring and then separated by means of a commercially available centrifugal separator, a so-called decanter, in the continuous flow process.

The underflow of the decanter (amylose fraction) is subsequently stirred again in approx. 50 kg of 0.03-n caustic soda solution for 1 h and separated once more. The solid phase of the decanter is then suspended in 40 kg of tap water for fiber separation.

The overflows of the first and second separation, which contain approx. 90% of the protein, are combined and further processed if necessary. Firstly, a 125 μm-sieve bend is used for separating the coarse fibers from the amylose-fraction. Separation of the fine fibers is then carried out with a stream elution apparatus arranged downstream of the sieve bend (mesh aperture of the sieve basket=75 μm). In the final two decanter stages, residual protein and small amounts of mineral substances are removed from the amylose. The underflow of the last separation is now adjusted with water to approx. 30% dry substance and spray-dried under mild conditions such that a powdery product is obtained.

In principle, amylose may also be extracted with water as a solvent.

Another possibility of extracting amylose is to effect fiber separation in two stages, with sieve bends being utilised for both the coarse fibers and the fine fibers. The separated fiber fractions of the 125-μm and 50-μm strainers are then re-washed three times with 15 kg of tap water each time. Hereby the amylose losses are considerably reduced without fiber separation being considerably influenced.

To this end, the suspension of approx. 10 kg pea flour is circulated in approx. 50 kg water at a volume flow rate of V=870 l/h and a homogeniser pressure of 180 bar for approx. 15 min. The subsequent amylose processing conforms with Example 1.

Due to use of the homogeniser, protein separation may be improved somewhat. Thus the protein proportion of the protein solution rises from 87.4% to 93.8% in relation to the total flour protein.

Analysis of the amylose-polysaccharide product produced according to the invention shows that the amylose which was extracted by the alkaline process according to Example 1 merely comprises approx. 0.4% (weight) crude protein in relation to the dry powder. Crude ash content, crude fiber content and crude fat content are clearly less than 1% (weight), the amylose yield amounts to >90%.

EXAMPLE 2

Manufacture of Articles from Amylose or Polysaccharide Compositions

The amylose obtained in Example 1 plastifies between approx. 80 to 100° C. and thus possesses thermoplastic properties. The amylose powder commonly resulting during production according to Example 1 as a polysaccharide product is first of all processed by pre-extrusion into a granulate which is processed into cup-shaped articles in conventional injection molding machines for the plastics processing industry.

The amylose herein advantageously has hydrophobic properties and imparts high flexibility and break resistance to the article, which is cup-shaped in an exemplary case.

The mechanical strength may in a given case even be increased by admixture of powders produced from vegetable fibers.

Although such a cup of at least largely pure amylose has excellent handling properties (cf. Table 1), the costs of such a cup-shaped article may even be further lowered by using a polysaccharide composition of approx. 75% (weight) amylose, 12.5% whole-wheat flour and 12.5% whole sweet-lupin seed flour as the polysaccharide product instead of amylose.

This polysaccharide composition, too, has thermoplastic properties and may readily be processed with the conventional injection molding technique into articles of different kinds, in the examplary case cups.

Such a cup also has the same favorable properties, like water resistance, flexibility and biodegradability, as the cup-shaped article of amylose-polysaccharide product.

For practical testing of the biodegradable drinking cups manufactured as the articles by the injection molding technique, a liquid exposition test is shown in the following table:

TABLE 1

Exposition of Drinking Cups of Amylose and Polysaccharide Compositions to Liquid

| | Life [h] | | |
|---|---|---|---|
| Cup composition | $H_2O$ approx. 20° C. | $H_2O$ approx. 50° C. | Acidic beverage approx. 20° C. |
| Amylose | 7–9 | | |
| 75% amylose 12.5% full-wheat flour 12.5% sweet lupin seeds | 6–8 | 6–8 | 3–5 |

With the present invention, it is thus for the first time possible to manufacture usable articles from an amylose-polysaccharide product or a polysaccharide composition, whereby a long-existing demand in the art has been satisfied.

What is claimed is:

1. Process for producing amylose from pea material having an amylose content in the range of approximately 70% (weight) to 93% (weight) based on total starch, wherein the pea material is dried and ground to produce a flour; and
   wherein said flour is mixed with 10 to 100 mM NaOH as a liquid decomposing agent for separation into soluble protein constituents and insoluble polysaccharide constituents, and the flour is decomposed in a stirring action; with
   a) a separation into a liquid protein phase and a solid phase containing polysaccharide being carried out;
   b) the solid phase being suspended in water;
   c) the aqueous polysaccharide suspension being subjected to at least two sifting steps, the first sifting step carried out by means of a sieve bend and the second sifting step by means of a stream elution apparatus comprising a sieve having a mesh aperture of approximately 50 µm to 90 µm and an inclination angle of approximately 15° to 45°, at least one of said sieve bend and stream elution apparatus having a defined mesh aperture for separating at least one of crude fiber and residual protein;
   d) the sieve residue being once more divided into the solid phase containing polysaccharide and the liquid phase; and
   e) the solid phase now reduced in protein and essentially containing amylose being subjected to a drying step.

2. Process as in claim 1, wherein said pea material is sifted in a pre-sifting step prior to mixing with said liquid decomposing agent.

3. Process as in claim 1, wherein step (e) further comprises a washing step prior to said drying step.

4. Process as in claim 1, wherein the mesh aperture of said stream elution apparatus comprising a sieve and/or a sieve basket is approximately 75 µm.

5. Process as in claim 1, wherein the inclination angle of said sieve basket is approximately 20°.

6. Process according to claim 1, wherein the amylose content of said pea material based on total starch is in a range of approximately 70% (weight) to 85% (weight).

7. Process according to claim 1, wherein the concentration of said aqueous solution of sodium hydroxide is approximately 20 to 80 mM.

8. Process according to claim 1, wherein the concentration of said aqueous solution of sodium hydroxide is approximately 30 mM.

9. Process according to claim 1, wherein at least one of step a) and step d) is carried out by centrifuging in continuous flow.

10. Process as in claim 9, wherein said centrifuging in continuous flow is by means of a decanter.

11. Process according to claim 9, wherein discharging the sedimented solid phase is carried out by means of a worm gear.

12. Process according to claim 1, wherein said sieve bend has a mesh aperture of approximately 90 µm to 140 µm.

13. Process according to claim 12, wherein said sieve bend has a mesh aperture of approximately 125 µm.

14. Process according to claim 12, wherein said sieve bend and said stream elution apparatus are arranged consecutively in the process direction.

15. Process according to claim 1, wherein in step e) a spray drier is used for drying the obtained amylose product.

16. Pea amylose product obtainable by a process of claim 1, wherein said amylose product is obtained by processing thermoplastically without the addition of water and a plasticising agent.

17. Pea amylose product according to claim 16, wherein said product is one of a powder and a granulate.

18. Pea amylose product according to claim 16, said product processed into shaped articles.

19. Thermoplastically processable polysaccharide composition containing:
   approximately 50% (weight) to 90% (weight) amylose as the main constituent, said amylose obtainable according to the process of claim 1; and
   at least another material of vegetable origin being a flour selected from the group consisting of:
      grasses, cereals, lupins, Cruciferae, leguminosae, and mixtures thereof.

20. Thermoplastically processable polysaccharide composition according to claim 19, wherein said grasses are viskantus; said cereals are selected from the group consisting of wheat, rye, and oats; said lupins are sweet lupins having a low alkaloid content; said Cruciferae are gold-of-pleasure; said leguminosae are selected from the group consisting of peas, lentils, beans, and soybeans; said plant fibers are selected from the group consisting of coco fibers, sisal fibers, and banana fibers; and mixtures thereof.

21. Polysaccharide composition according to claim 19, having the following quantitative composition:
   amylose: approximately 50% (weight) to 90% (weight),
   full-wheat flour: approximately 5% (weight) to 50% (weight), and
   full flour from sweet lupin seeds: approximately 5% (weight) to 50% (weight).

22. Polysaccharide composition according to claim 21, having the following quantitative composition:
   amylose: approximately 60% (weight) to 80% (weight),
   full-wheat flour: approximately 10% (weight) to 20% (weight), and
   full flour from sweet lupin seeds: approximately 10% (weight) to 20% (weight).

23. Article consisting of a polysaccharide composition according to claim 21, wherein said article is biodegradable and has a life of approximately 5 hours in water at room temperature.

24. Article consisting essentially of amylose, obtainable according to claim 1, wherein said article is biodegradable and has a life of approximately 5 hours in water at room temperature.

25. Article according to claim 23, said article selected from the group consisting of sheets and packaging articles.

26. Article according to claim 25, said article selected from the group consisting of dishes, cutlery, drinking vessels, bags, carrying bags, sheets, blister packaging material, hoses, and cans.

27. Article according to claim 26, wherein said article is a sheet.

28. Article according to claim 26, wherein said article is a drinking vessel which has a life of at least approximately 3 hours when containing an acidic beverage.

29. Article according to claim 25, wherein said article has a transparency of from transparent to translucent.

30. Thermoplastically processable polysaccharide composition containing:
   approximately 50% (weight) to 90% (weight) amylose as the main constituent, said amylose obtainable according to the process of claim 1; and
   at least another material of vegetable origin being a flour obtained from plant fibers.

\* \* \* \* \*